ID#

United States Patent [19]
Joensuu

[11] Patent Number: 5,924,035
[45] Date of Patent: Jul. 13, 1999

[54] METHOD AND APPARATUS FOR DIALING A B-NUMBER WITHIN A MOBILE TELECOMMUNICATIONS SYSTEM

[75] Inventor: Erkki Joensuu, Plano, Tex.

[73] Assignee: Ericsson Inc., Research Triangle Park, N.C.

[21] Appl. No.: 08/622,735

[22] Filed: Mar. 27, 1996

[51] Int. Cl.$^6$ ............................................. H04Q 7/38
[52] U.S. Cl. ......................... 455/445; 455/415; 455/435
[58] Field of Search .................................. 455/415, 445, 455/435

[56] References Cited

U.S. PATENT DOCUMENTS

| | | | |
|---|---|---|---|
| 5,153,904 | 10/1992 | Coombes et al. | 379/58 |
| 5,157,719 | 10/1992 | Waldman | 379/356 |
| 5,274,693 | 12/1993 | Waldman | 379/59 |
| 5,545,027 | 8/1996 | Kennedy et al. | 379/60 |

FOREIGN PATENT DOCUMENTS

WO 95/01693  1/1995  WIPO .
WO 95/06381  3/1995  WIPO .

OTHER PUBLICATIONS

Mouly M. Et al.; "The GSM System for Mobile Communications" Jan. 1, 1993, Lassay-les-Chateaux, XP002038196.

Primary Examiner—Dwayne D. Bost
Assistant Examiner—Linwood C. Scott, Jr.
Attorney, Agent, or Firm—Jenkens & Gilchrist, P.C.

[57] ABSTRACT

A mobile subscriber is able to request an outgoing call setup without dialing a Numbering Plan Area (NPA) number. A mobile subscriber specifies a particular NPA number to be used with all subsequently dialed local calls. The user specified NPA number is encapsulated into an Unstructured Supplementary Service Data (USSD) message and transported over to the associated home location register (home HLR). Whenever the mobile station performs a location update, or stores a new NPA number, the home HLR copies the stored NPA number to the serving mobile switching center (MSC). Subsequently, whenever the mobile station originates an outgoing call setup with only a local directory number, the MSC retrieves the copied NPA number and generates a complete B-number by concatenating the retrieved NPA number with the subscriber dialed local directory number. The generated B-number is then utilized to properly process the outgoing call setup.

13 Claims, 8 Drawing Sheets

METHOD AND APPARATUS FOR DIALING A B-NUMBER WITHIN A MOBILE TELECOMMUNICATIONS SYSTEM

BACKGROUND OF THE INVENTION

1. Technical Field of the Invention

The present invention relates to a mobile telecommunications system and, in particular, to the dialing of a B-number for originating a call within a Public Land Mobile Network.

2. Description of Related Art

In a conventional mobile telecommunications network, such as an analog cellular telecommunications network, whenever a mobile subscriber enters a local directory number, the mobile station automatically retrieves a Numbering Plan Area (NPA, more commonly known as an area code) number assigned to the mobile station and prepends it to the dialed local directory number. This is because the serving mobile telecommunications network needs a complete B-number including both the NPA number and the seven digit local directory number to properly process the call setup request. Accordingly, whenever the mobile subscriber dials only a seven digit local directory number (such as 555-1212), the mobile station presumes that the mobile subscriber wishes to dial another local number within the same NPA area and prepends the mobile station's own NPA number to the dialed local directory number. For example, if the mobile station has been assigned a 214 NPA number, the above dialed 555-1212 will be transformed to 214-555-1212 before being transmitted to the serving mobile switching center (MSC).

With the introduction of the Personal Communications System (PCS), mobile stations no longer transmit NPA numbers to the serving MSC when requesting an outgoing call setup. Furthermore, because there are usually more than one NPA value per particular geographic area, it is no longer consistent to presume that the NPA number for a dialed local directory number is the same NPA number assigned to the requesting mobile station.

As an illustration, the Dallas, Texas area is served by two different NPA numbers. The 214 NPA number serves the majority of the Dallas area. The newer 760 NPA number has been assigned to serve some suburban areas outside of the Dallas city limit, but still within the Dallas county jurisdiction. If a mobile subscriber subscribes to a mobile service and is assigned the 760 NPA number for his mobile station, yet uses his mobile service mostly within the 214 area, the mobile subscriber has to enter the 214 NPA number for each of his outgoing calls. Furthermore, if the mobile subscriber travels into a visited PLMN (roaming) area and tries to use his telecommunications service to originate local calls, the mobile subscriber again has to enter the corresponding NPA number for that particular PLMN. This is because the visited PLMN does not know which NPA number to utilize when a roaming subscriber dials only a local directory number.

Therefore, it would be advantageous to remove the logical relationship between the NPA number to be assigned to dialed local directory numbers and the NPA number assigned to the mobile station. It would further be advantageous to enable a mobile subscriber to selectively designate a particular NPA number to be used with all subsequently dialed local directory numbers.

SUMMARY OF THE INVENTION

A mobile station transmits a particular Numbering Plan Area (NPA) number to the serving mobile switching center (MSC) over a connection-less communications link. The MSC stores the received NPA number in a home location register (HLR) associated with that particular mobile station. Whenever the mobile station performs a location update, the HLR associated with that mobile station copies subscriber information including the stored NPA number to the serving MSC. If the mobile station then requests an outgoing call setup but dials only a seven digit directory number, the MSC then serving the mobile station retrieves the stored NPA number from the register and originates an outgoing call setup with a complete B-number formed by concatenating the retrieved NPA number with the entered seven digit directory number.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
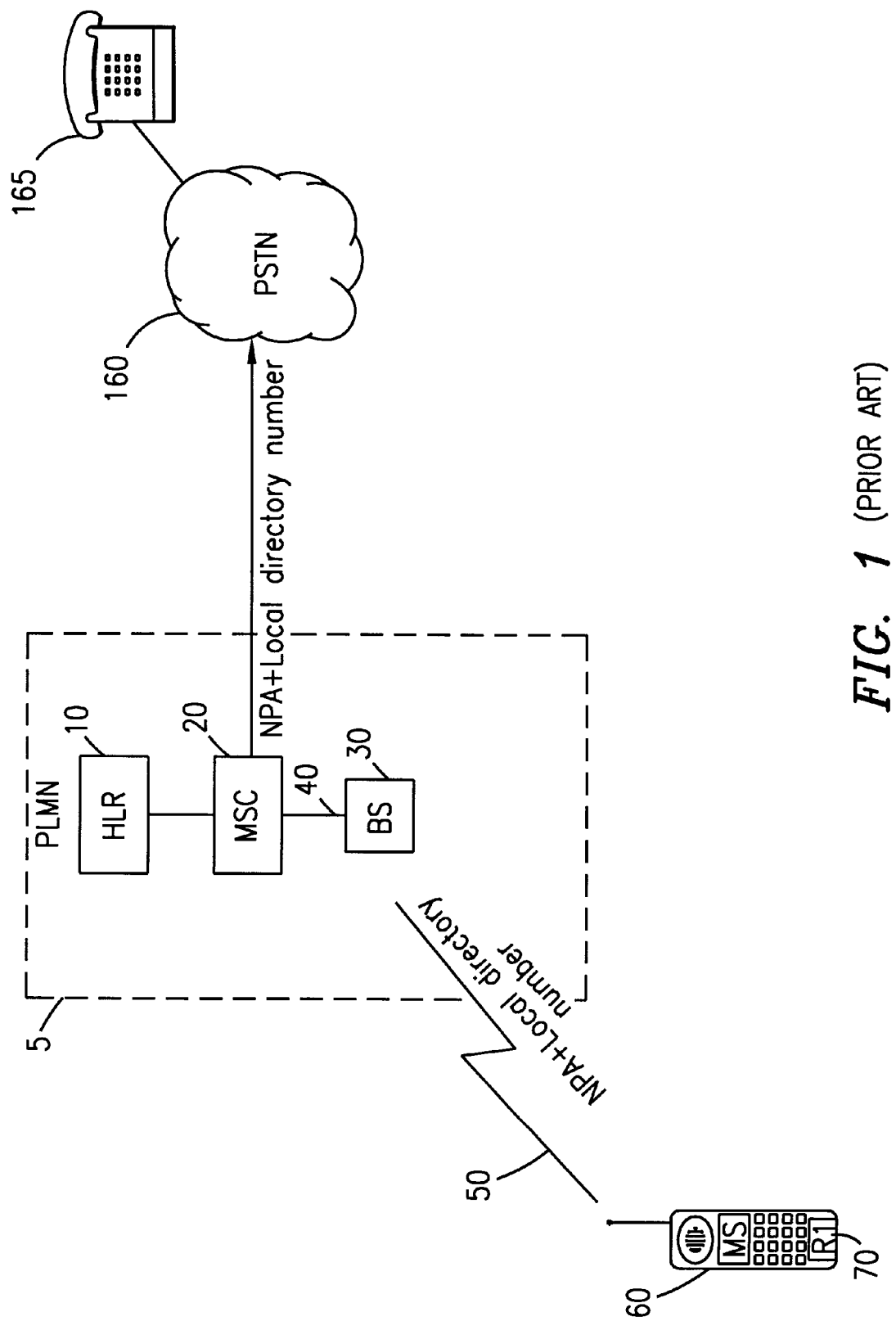
FIG. 1 is a block diagram of a Public Land Mobile Network (PLMN) illustrating a mobile station originating an outgoing call setup request to a mobile switching center (MSC) in accordance with the prior art.

FIG. 1 is a block diagram of a Public Land Mobile Network (PLMN) 5 illustrating a mobile station 60 originating an outgoing call setup request to a mobile switching center (MSC) 20 in accordance with the prior art. The PLMN 5, which is used to communicate with a mobile station 60, comprises a mobile switching center (MSC) 20, a home location register (HLR) 10, a visitor location register (VLR, not shown), and a base station (BS) 30. The BS 30 is connected to the MSC 20 using a digital or analog communications link 40, and communicates with a mobile station 60 via a radio channel 50. The mobile station 60 further communicates with other subscribers, such as a wireline terminal 165, via a Public Switched Telephone Network (PSTN) 160. The HLR 10 is a data base containing information about all "home" subscribers, their services, and location. The home subscribers are the subscribers who have service subscription agreements with the PLMN 5.

A call from the mobile station 60 starts when the mobile subscriber first keys in the desired B-number (called party directory number) and then presses the send button. An access channel is seized, whereupon the mobile identity and the entered number are automatically transmitted to the MSC 20 via the BS 30. The MSC 20 retrieves the subscriber category information for the calling subscriber from the HLR 10 and verifies that the subscriber has access to the system. The keyed number is also analyzed to determine if the subscriber is allowed to call that particular number. If all analyses are affirmative, the mobile subscriber is assigned to an analog or digital voice channel 50 and the call is set up.

The call is set up by analyzing a B-number entered by the mobile subscriber. For example, a B-number in the United States is comprised of a three digit Numbering Plan Area (NPA) Number and a seven digit local directory number. Even though the serving MSC 20 needs a complete B-number including the NPA and the local directory number to properly analyze and process the call setup, mobile subscribers are usually not required to enter the full ten digits while making a local call. When a mobile subscriber only enters a seven digit number, the mobile station 60 automatically retrieves the NPA number assigned to the mobile station 60 from the memory location (R1) 70 and prepends it to the dialed seven digit number before transmitting the number to the serving MSC 20. Hence, the mobile station 60 presumes that the mobile subscriber has made a local call setup request and that the dialed local directory number should have the same NPA number assigned to the mobile station 60.

Since many of the NPA numbers in North America are congested, mobile subscribers within the same geographic area are no longer being served by a single NPA number. Therefore, mobile subscribers are now required to dial different NPA numbers even when making local calls within the same geographic area. Furthermore, the standard mandated by the Personal Communications System (PCS) does not require mobile stations to prepend and transmit NPA numbers when mobile subscribers only dial local directory numbers. As a result, if a mobile subscriber makes a local call within the same NPA area, the subscriber inconveniently has to dial his own NPA number to provide the mobile network with a complete B-number.

Therefore, it would be advantageous to enable a mobile subscriber to selectively designate a particular NPA number and to enable the mobile telecommunications system to utilized the user specified NPA number whenever the mobile subscriber only dials a local directory number.

Signaling for telecommunications services is normally performed in a structured way. For example, specific predefined data, formats, and signal names are used to setup a speech connection, to perform handovers, and to authenticate subscriber information when providing telecommunications service to a mobile subscriber. However, with the introduction of the Global System for Mobile (GSM) communications and the Personal Communications System (PCS), a number of new and advanced supplementary services are being provided to mobile subscribers. Since these supplementary services utilize user specified data, there are no structured ways to communicate these data between a PLMN application and a mobile station. As a result, a number of unstructured message protocols have been developed for the GSM or PCS environment. Once such protocol is the Short Message Service (SMS) protocol for transporting information between a PLMN and a mobile station. Another protocol is USSD which has been introduced to enable user interaction between GSM PLMN applications and a mobile station in a transparent way through the mobile telecommunications network. It is transparent because no review or manipulation of the contents of the message is performed during transportation.

Figure 2:
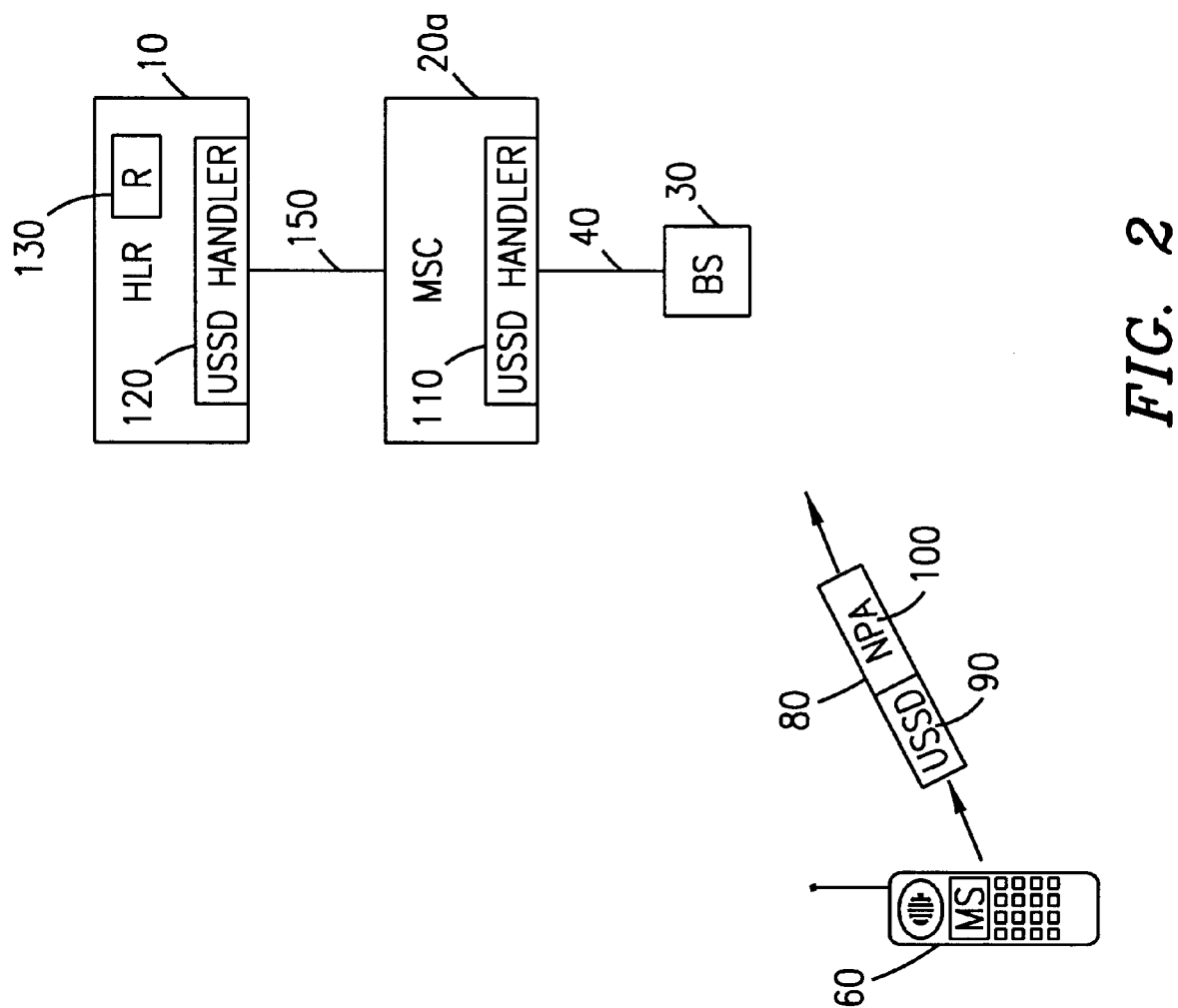
FIG. 2 is a block diagram of a PLMN illustrating a mobile station transmitting an Unstructured Supplementary Service Data (USSD) message to the home MSC.

FIG. 2 is a block diagram of a PLMN illustrating a mobile station 60 transmitting a USSD message 80 to the home MSC 20*a*. In accordance with the teachings of the present invention, a USSD message 80 is utilized to transport a user specified NPA number to the home HLR 10. A mobile subscriber enters a desired NPA number to be used with all subsequently dialed local directory numbers. The mobile station 60 encapsulates the entered NPA number into a USSD message 80 and transmits it to the serving MSC 20*a* via a connection-less communications link such as a Stand-alone Dedicated Control Channel (SDCCH). The header data 90 within the USSD message 80 specifies which application module needs to receive this particular message. For this instance, the home HLR 10 is specified as the destination node for this particular USSD message. The transmitted USSD message 80 is received by the BS 30 and routed to the serving MSC 20*a* via the link 40. The USSD handler 110 residing within the MSC 20*a* receives the transmitted USSD message 80, reviews the header data 90, and determines that the USSD message 80 needs to be forwarded to the HLR 10 via the link 150. Subsequently, the USSD handler 120 within the HLR 10 receives the transmitted USSD message 80 and determines that the HLR 10 is the intended destination node for this particular message. The encapsulated NPA number is then extracted from the data section 100 by the HLR 10 and stored into a memory register (R) 130. Accordingly, the memory register (R) 130 within the home HLR 10 stores a user specified NPA number for future utilization.

Furthermore, within the PCS environment, a number of different services, known as Basic Services, are provided to a single subscription. A mobile station 60 can utilize a separate voice call, fax call, or other data calls with the serving MSC 20*a*. In accordance with the teachings of the present invention, a mobile subscriber can designate a separate NPA number for each different Basic service. As a result, whenever the mobile subscriber makes a voice call by dialing only a seven digit number, a first user specified NPA number is utilized to generate a complete B-number. On the other hand, if the mobile subscriber makes a data call also by dialing only a seven digit number, a second user specified NPA number is utilized to generate the B-number.

Figure 3:
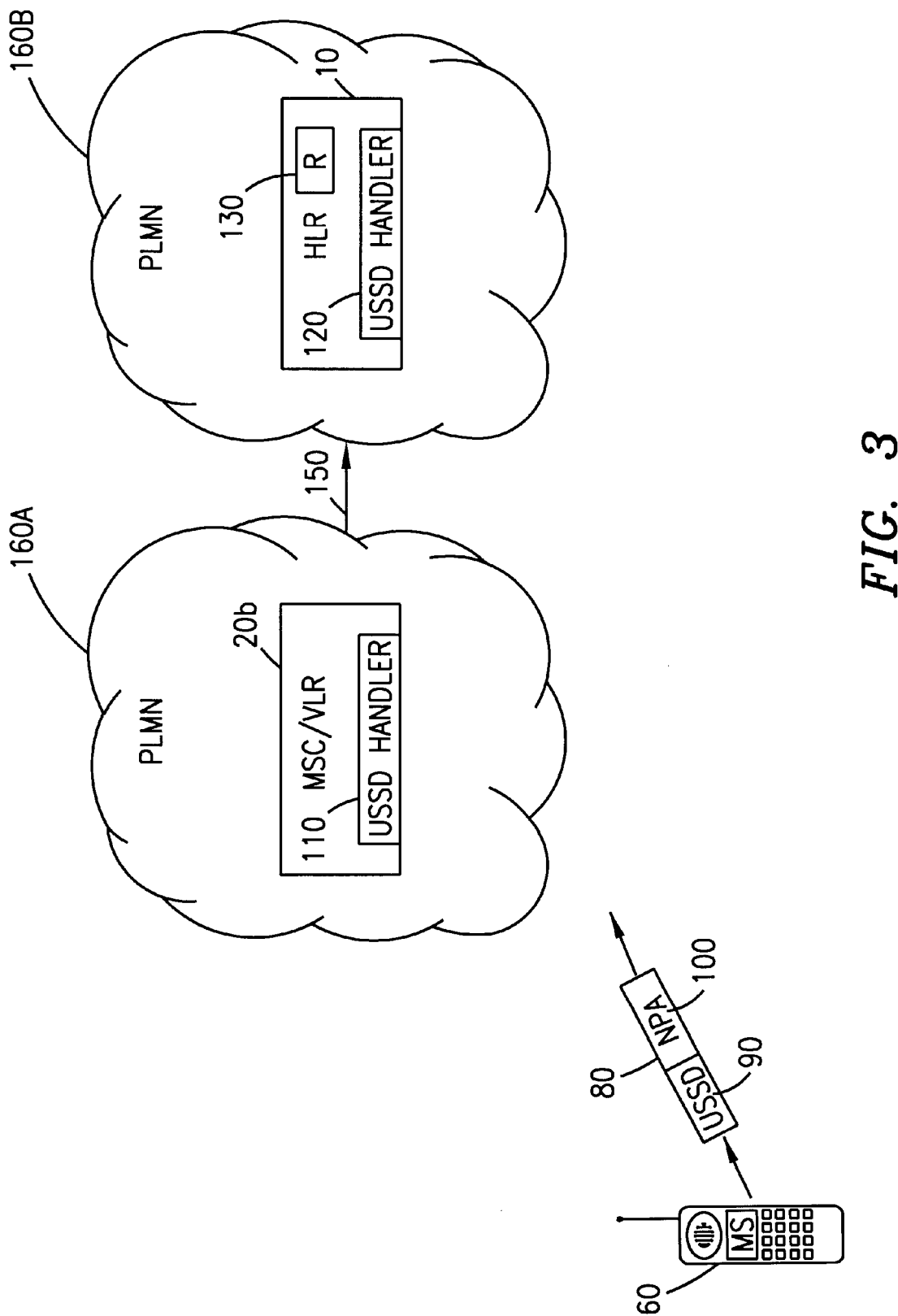
FIG. 3 is a block diagram of a PLMN illustrating a mobile station transmitting a USSD message to a visited MSC.

FIG. 3 is a block diagram of a PLMN illustrating a mobile station 60 transmitting a USSD message 80 to a visited MSC 20*b*. As mentioned previously, USSD messages are handled transparently by the serving MSC 20. For example, even if the mobile station 60 is roaming and being served by a visited MSC, the above described steps are performed similarly. As described in FIG. 2, a mobile subscriber enters a desired NPA number, and the mobile station 60 encapsulates the entered NPA number into a USSD message 80 and transmits it to the serving MSC 20*b* within the visited PLMN 160*a*. The USSD handler 110 within the serving MSC 20*b* receives the transmitted USSD message 80, reviews the header data 90 and determines that this particular USSD message needs to be routed to the HLR 10 within the home PLMN 160*b* via a network link 150. The USSD handler 120 within the home HLR 10 receives the rerouted USSD message 80 and accordingly extracts the NPA number from the data section 100 and stores the extracted NPA number in the memory register (R) 130. As far as the home HLR 10 is concerned, it does not matter whether the USSD message is transmitted and received within the home PLMN 160*b* or the visited PLMN 160*a*. The transmitted USSD messages are handled transparently by the serving MSC 20, and properly rerouted to the home HLR 10.

Figure 4:
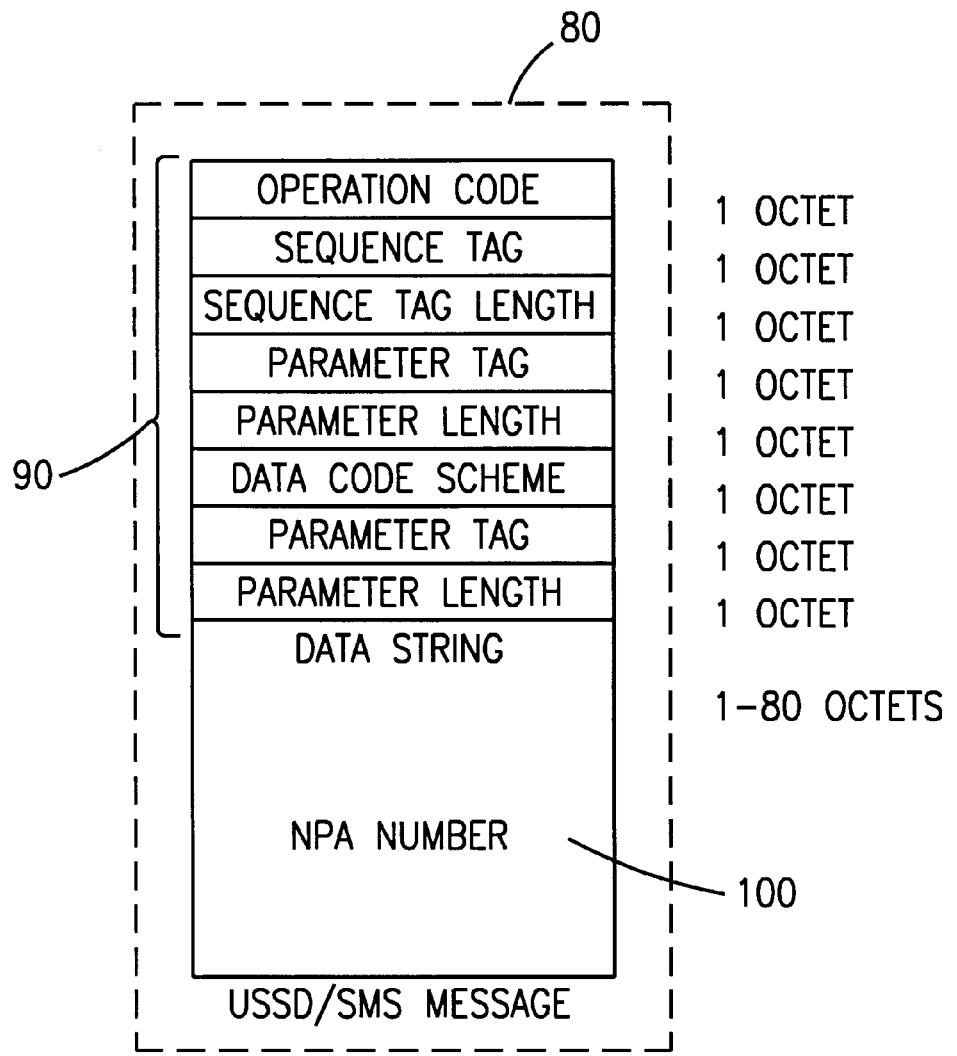
FIG. 4 illustrates the data format of a USSD or Short Message Service (SMS) message.

Now referring to FIG. 4, there is shown a block diagram illustrating the data format of a USSD or SMS message 80.

SMS messages have the same structure or data format as USSD messages, encapsulate character based data, and communicate over a connection-less data channel such as an SDCCH. Even though SMS messages are normally used by different types of application services, for purposes of the present invention, both USSD and SMS messages can be utilized. As illustrated, the first eight octets 90 are used to specify which operation, application, language, parameter, data length, and data sequences are being used. The remaining eighty octets 100, if needed, are used to transport alphanumeric character data such as a user specified NPA number. Therefore, the first eight octets specify which HLR or module needs to receive the encapsulated NPA number. The remaining eighty octets 100 comprise the subscriber specified NPA number to be transported.

Figure 5:
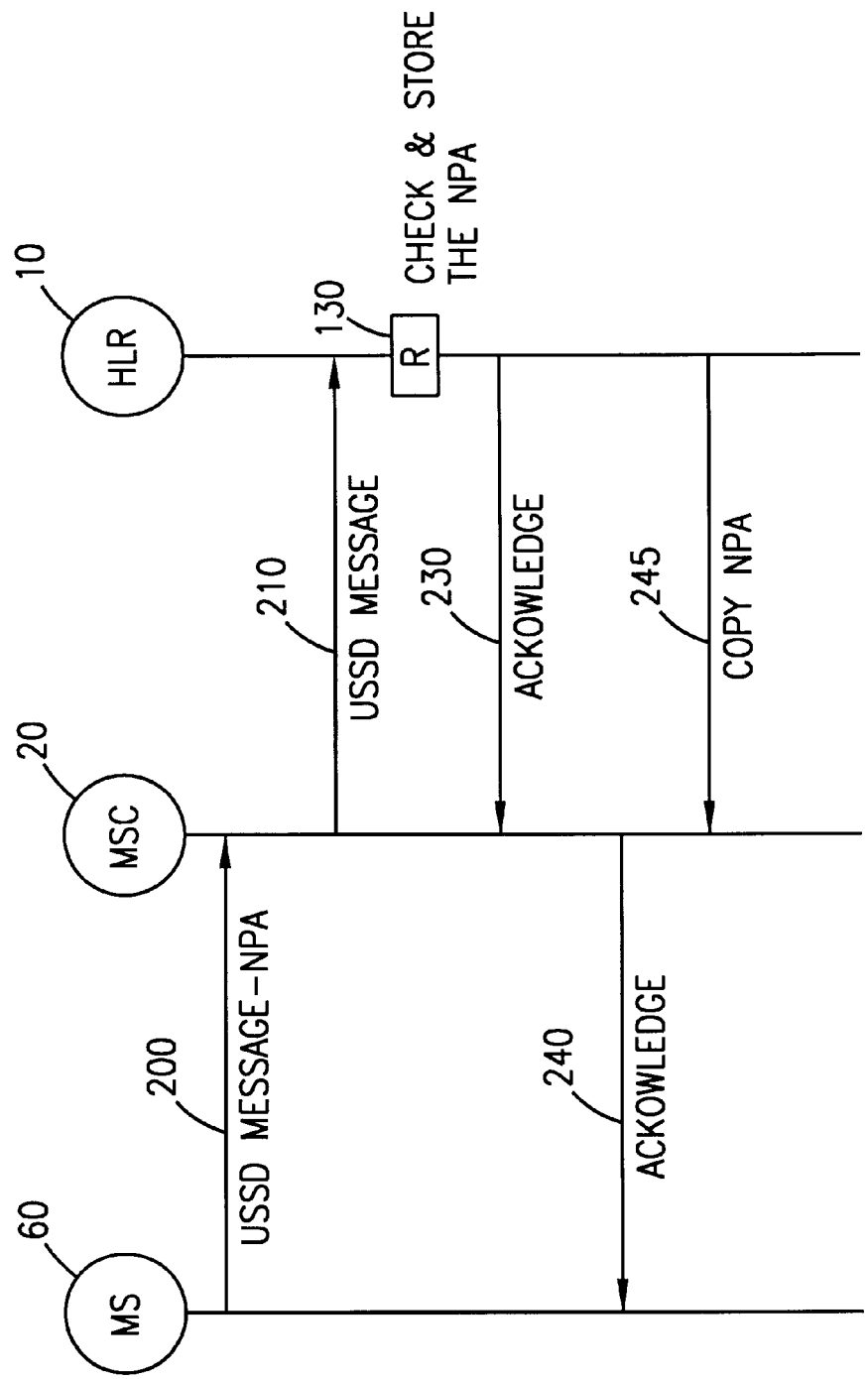
FIG. 5 is a signal sequence diagram illustrating the signals transmitted for storing a particular NPA number in a home location register (HLR)

FIG. 5 is a signal sequence diagram illustrating signals transmitted for storing a particular NPA number in the home HLR 10. As described above, the mobile station (MS) 60 transmits a USSD message 80 encapsulating the user specified NPA number to the serving MSC 20 over a connection-less communications link (signal 200). The USSD handler within the serving MSC 20 determines that this particular USSD message is intended for the home HLR 10 and accordingly reroutes the message (signal 210). The home HLR 10 extracts the encapsulated NPA number from the received USSD message and stores it in the memory register (R) 130. The home HLR 10 then transmits an acknowledgment signal 230 back to the serving MSC 20 notifying that the USSD message has been properly handled. The serving MSC 20 further transmits a USSD message signal 240 containing the acknowledgment result back to the mobile station 60. The home HLR 10 also sends an application layer signal 245, such as a Mobile Application Part (MAP) signal, to copy the stored NPA number to the serving MSC 20.

Even though the MSC 20 initially received the USSD message containing the user specified NPA number from the mobile station 60, because the message was transparently handled, the serving MSC 20 did not have a chance to store the NPA number itself. Accordingly, the stored NPA number is copied from the home HLR 10 to the serving MSC 20 to eliminate the need of the serving MSC 20 to repeatedly communicate with the home HLR 10 in order to process future calls. By copying and storing the user specified NPA number within the serving MSC 20, until the mobile station travels outside of the MSC's coverage area or specifies a new NPA number, there is no need for the serving MSC 20 to continuously communicate with the home HLR 10 for each individual outgoing call setup. This reduces the number of communications between the serving MSC 20 and the home HLR 10 and, as a result, reduces the traffic and congestion problems within the mobile network.

Figure 6:
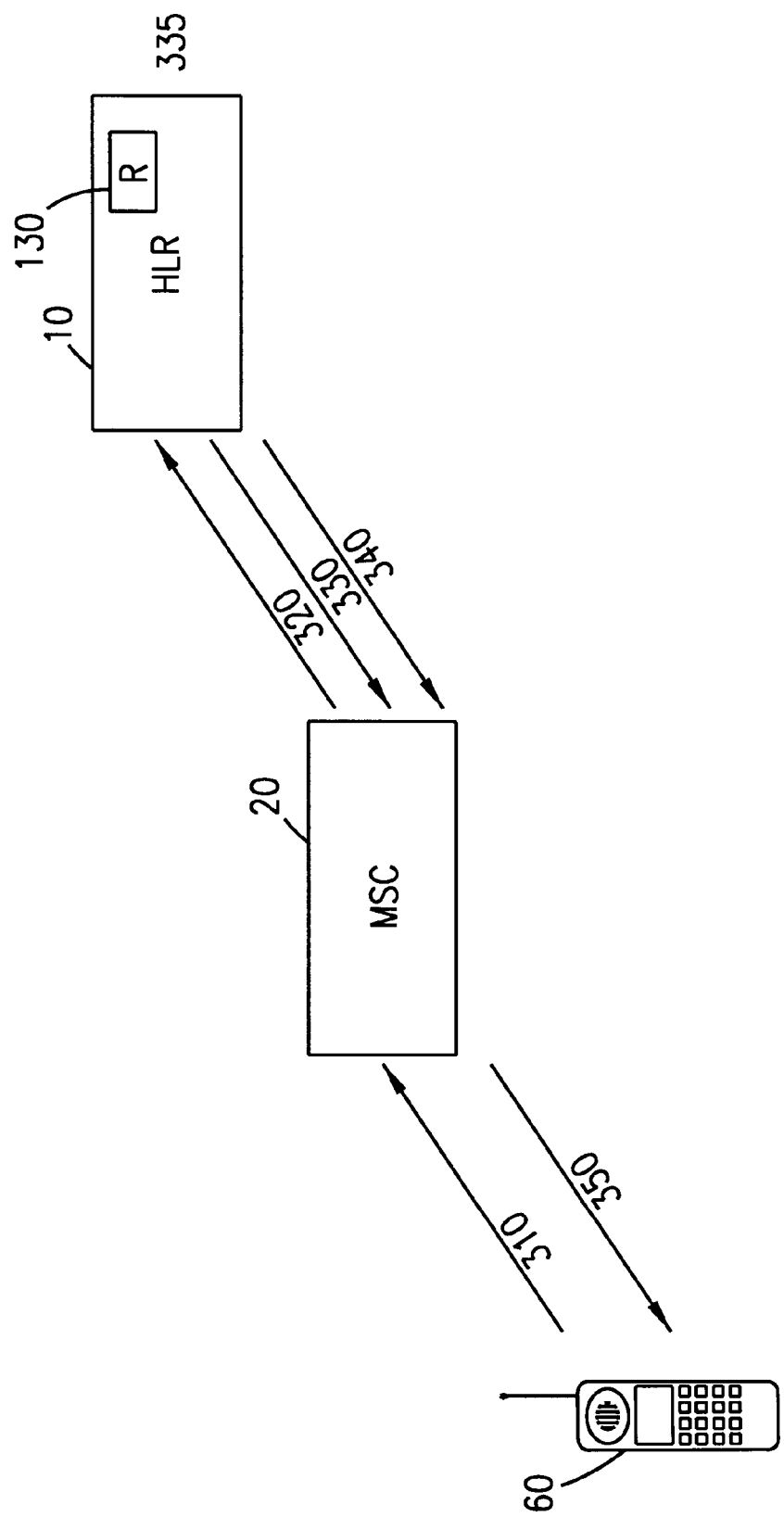
FIG. 6 is a block diagram illustrating an MSC serving a particular mobile station receiving an NPA number from an HLR during location update process.
Figure 7:
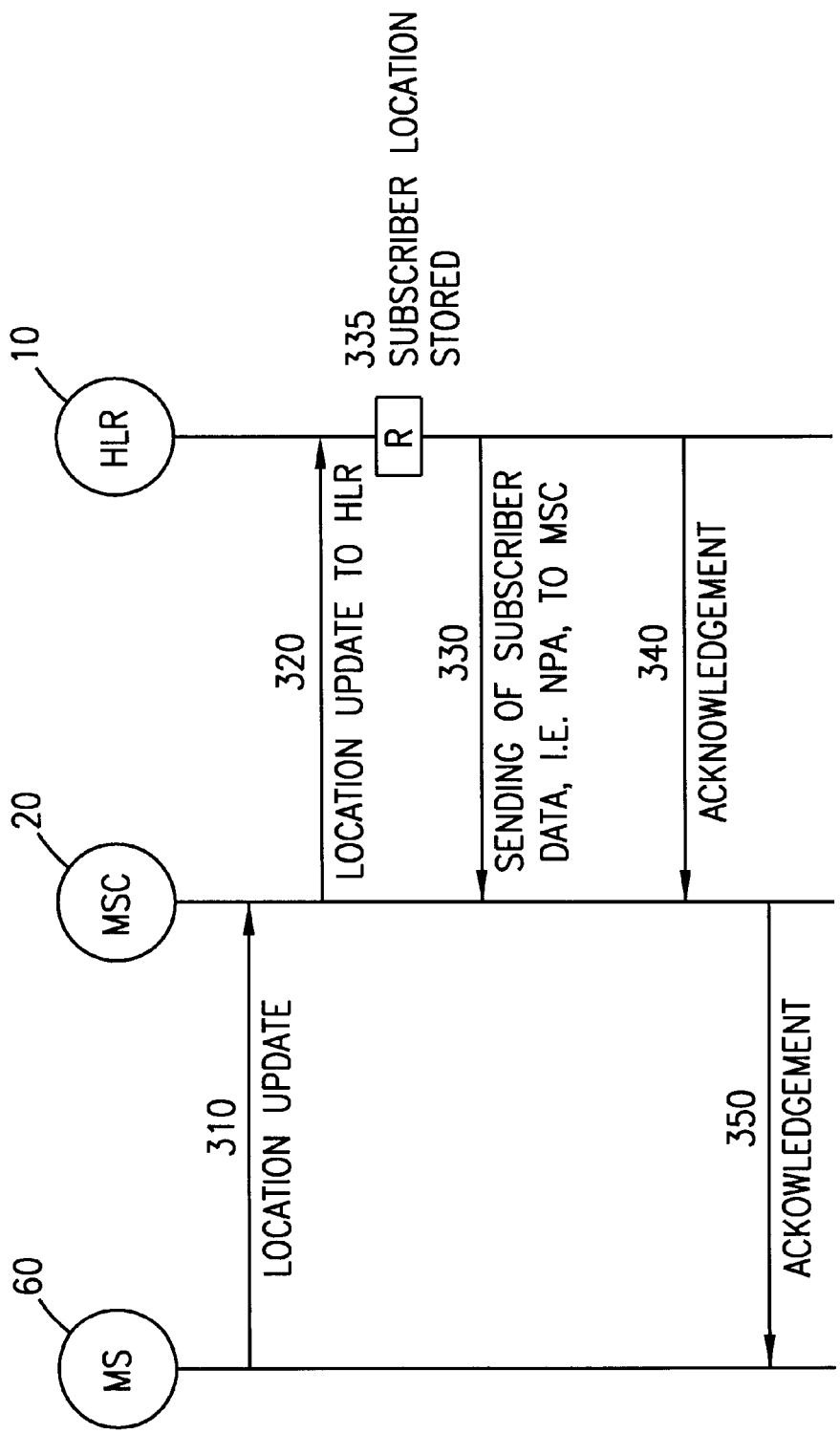
FIG. 7 is a signal sequence diagram illustrating an MSC serving a particular mobile station receiving an NPA number from an HLR during location update process.

Now referring to both FIGS. 6 and 7, there is shown a MSC 20 communicating with the home HLR 10 to retrieve the customer designated NPA number. As mentioned in FIG. 5, because of signaling congestion and capacity problems, the serving MSC 20 cannot repeatedly request and retrieve the stored NPA number from the home HLR 10 whenever the mobile station 60 makes an outgoing call. Therefore, when the mobile station 60 specifies the NPA number to be stored, the HLR 10 copies the stored NPA number to the serving MSC as described above in FIG. 5. However, if the mobile station 60 stores a particular NPA number while being served by a first MSC and then travels into a second MSC, the second MSC also needs to be copied with the stored NPA number from the home HLR 10.

Whenever the mobile station 60 travels into a new MSC area, the mobile station 60 transmits a signal 310 requesting a location update with the new MSC 20. The new MSC 20, in turn, transmits an application layer signal 320 such as a Mobile Application Part (MAP) signal, to the home HLR 10 informing of the mobile station's new location. The HLR 10 takes note of the new roaming location for rerouting of all future terminating calls to the new MSC 20 (action 335). The home HLR 10 retrieves the necessary subscriber information regarding the mobile station 60 from its database records and transmits signals 330 containing the retrieved subscriber data to the new MSC 20. The home HLR 10 further retrieves the previously stored NPA number from the memory location (R) 130 and transmits it to the new MSC 20 with the signal 330. The home HLR 10 also transmits an acknowledgment signal 340 back to the new MSC 20 with a successful location update result code. The serving MSC 20, in turn, transmits an acknowledgment signal 350 back to the mobile station 60 further informing of the successful location update process by the mobile network. The new MSC 20 has now been informed of the subscriber designated NPA number and is able to process local directory numbers dialed by the mobile subscriber without repeatedly communicating with the home HLR 10.

Figure 8:
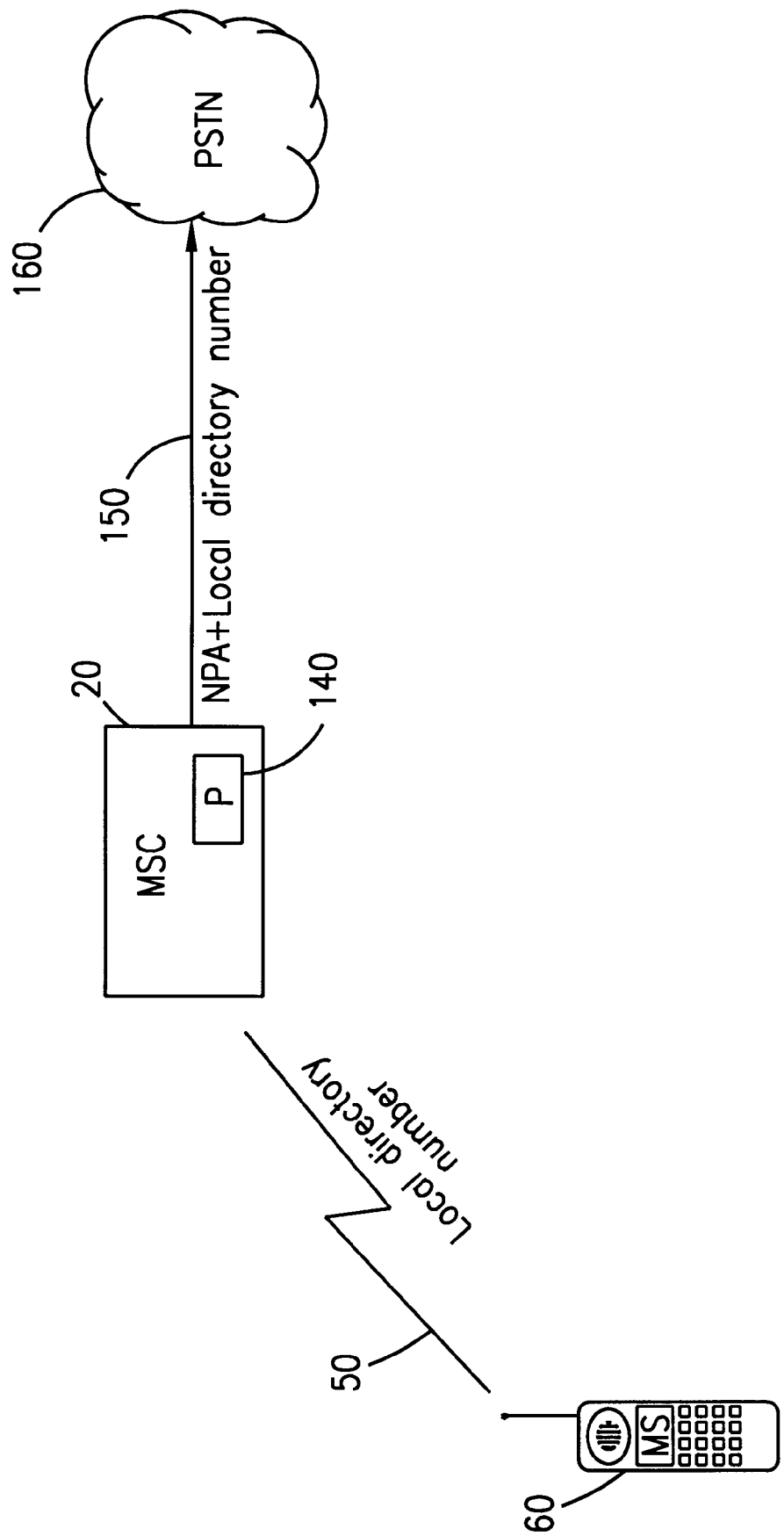
FIG. 8 is a block diagram illustrating an MSC originating an outgoing call setup using a stored NPA number and a subscriber dialed local directory number in accordance with the teachings of the present invention.

FIG. 8 is a block diagram illustrating a MSC 20 originating an outgoing call setup using a subscriber specified NPA number and a subscriber dialed local directory number in accordance with the teachings of the present invention. As described previously, it does not matter whether the serving MSC is the "home" MSC or visited MSC. Whenever the mobile station 60 specifies a NPA number to be stored with the home HLR (not shown in FIG. 8) or performs a location update, the serving MSC 20 receives and stores the user specified NPA number. Whenever the mobile station 60 thereafter originates an outgoing call setup request with only a local directory number as illustrated by the radio link 50, the serving MSC 20 determines that the dialed digits are insufficient to be processed and invokes the processor (P) 140. The processor (P) 140 retrieves the stored NPA number, which has been previously received from the HLR 10, and generates a complete B-number by concatenating the retrieved NPA number with the subscriber dialed local directory number. The generated B-number is now utilized by the serving MSC 20 to properly process the call setup request, and outgoing call connection is initiated over the trunk line 150, if needed, towards the PSTN 160.

The stored NPA number can also be utilized to perform other telecommunications functions. One such function includes the activation of a call forwarding subscriber feature requiring a complete B-number. Whenever a mobile subscriber activates a call forwarding subscriber feature, such as a Call Forwarding Busy (CFB), a complete B-number is required by the CFB feature module. In accordance with the teachings of the present invention, the mobile subscriber activates the CFB feature by entering only a local directory number. The serving MSC transparently forwards the activation request and the entered forward-to-number to the HLR. The HLR then determines that only the local directory number has been entered by the mobile station and retrieves the stored NPA from its register (R). The HLR then generates a complete B-number by concatenating the retrieved NPA number with the subscriber entered local directory number. The concatenated B-number is then utilized to properly activate the requested call forwarding subscriber feature. The complete B-number stored in the HLR is later used by the CFB feature to accordingly reroute incoming calls to the designated forward-to-number.

By storing the user designated NPA number in the home HLR, the mobile subscriber is able to freely travel to other MSC areas and still conveniently utilize the seven digit dialing pattern. If the mobile subscriber later wishes to change the NPA number to a different value, the mobile subscriber may freely update the NPA number stored in the home HLR by utilizing the USSD system.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for generating a B-number within a mobile telecommunications system supporting a plurality of basic calling services, said B-number comprising a first number and a second number, said method comprising the steps of:

receiving for each individual one of the plurality of basic calling services a particular first number from a mobile station;

storing said particular first number linked to its specified basic calling service in a home location register associated with said mobile station;

copying said particular first number to a first register within a mobile switching center whenever said mobile switching center performs a location update procedure with said home location register;

receiving a request to originate a call from said mobile station, said request including a dialed second number;

identifying which certain one of the plurality of basic calling services is being implicated by the originated call;

retrieving said particular first number from said first register that is linked to the identified certain basic calling service implicated by the originated call; and generating said B-number by prepending said retrieved particular first number to said second number.

2. The method of claim 1 wherein said particular first number comprises a particular Numbering Plan Area (NPA) number.

3. The method of claim 2 wherein said mobile station is assigned a NPA number and said particular NPA number is not the same as said NPA number assigned to said mobile station.

4. The method of claim 2 wherein said second number comprises a local directory number.

5. The method of claim 1 wherein said step of receiving said particular first number further comprises the step of receiving said particular first number over a connection-less communications link.

6. The method of claim 5 wherein said step of receiving further comprises the step of receiving said first number using an Unstructured Supplementary Service Data (USSD) message.

7. The method of claim 1 wherein said plurality of basic calling services comprise voice calls, fax calls and data calls.

8. A system for generating a B-number within a mobile telecommunications system supporting a plurality of basic calling services for a mobile station, said B-number comprising a first number and a second number, said mobile station dialing only said second number, said system comprising:

a receiver for receiving a particular first number for each individual one of the plurality of basic calling services, each first number received over a connection-less communications link from said mobile station;

a home location register for initially storing said particular first number;

a first register within a mobile switching center serving said mobile station for storing said particular first number linked to its specified basic calling service;

means for retrieving said particular first number from said home location register for storing in said first register whenever said mobile switching center performs a location update procedure with said home location register; and a processor including means, responsive to a mobile station request to originate an outgoing call with said second number, for identifying which certain one of the plurality of basic calling services is being implicated by the originated call, retrieving said particular first number from said first register that is linked to the identified certain basic calling service implicated by the originated call and for generating said B-number by prepending said retrieved particular first number to said second number.

9. The system of claim 8 wherein said particular first number comprises a Numbering Plan Area (NPA) number.

10. The system of claim 9 wherein said mobile station is assigned a second NPA number and said NPA number is not the same as said second NPA number.

11. The system of claim 9 wherein said second number comprises a local directory number.

12. The system of claim 8, wherein said processor is within said mobile switching center (MSC) serving said mobile station.

13. The system of claim 8 wherein said connectionless communications link comprises a Unstructured Supplementary Service Data (USSD) system and said receiver comprises a USSD handler.

* * * * *